(12) United States Patent
Takahashi

(10) Patent No.: US 6,374,626 B1
(45) Date of Patent: Apr. 23, 2002

(54) REFRIGERATED TRANSPORT VEHICLE

(75) Inventor: Wataru Takahashi, Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/482,087

(22) Filed: Jan. 13, 2000

(30) Foreign Application Priority Data

Jan. 25, 1999 (JP) ............................................ 11-016260

(51) Int. Cl.⁷ ............................................... F25D 21/14
(52) U.S. Cl. .......................................... 62/239; 62/298
(58) Field of Search .................................. 62/239, 298

(56) References Cited

U.S. PATENT DOCUMENTS

| | | | |
|---|---|---|---|
| 4,109,485 A | | 8/1978 | Grosskopf |
| 4,748,824 A | | 6/1988 | Wakabayashi et al. |
| 4,936,104 A | * | 6/1990 | Hicke .............................. 62/89 |
| 5,012,653 A | * | 5/1991 | Ryde et al. .................... 62/429 |
| 5,132,257 A | * | 6/1992 | Anderson et al. ............. 62/239 |
| 5,222,373 A | * | 6/1993 | Waldschmidt ................ 62/239 |
| 5,265,435 A | * | 11/1993 | Richardson .................. 62/133 |
| 5,878,592 A | * | 3/1999 | Borges et al. ................. 62/239 |
| 5,954,578 A | * | 9/1999 | Takasaki .................... 454/121 |
| 6,202,434 B1 | * | 3/2001 | Hearne, Jr. ................... 62/304 |

FOREIGN PATENT DOCUMENTS

| | | |
|---|---|---|
| WO | WO 99/00632 | 1/1999 |
| WO | WO99/00632 | 7/1999 |

* cited by examiner

Primary Examiner—William E. Tapolcai
Assistant Examiner—Mohammad M. Ali
(74) Attorney, Agent, or Firm—Oblon, Spivak, McClelland, Maier & Neustadt, P.C.

(57) ABSTRACT

One object of the present invention is to provide a refrigerated transport vehicle which comprises a small and light weight cooling system easily fitted to the vehicle; in order to accomplish the above object, the refrigerated transport vehicle comprising a vehicle body; an adiabatic freezing chamber which is provided on the vehicle body and comprises an opening; an adiabatic evaporator chamber fixed to an outer surface of the freezing chamber so as to cover the opening and to communicate inner spaces of the freezing chamber and the evaporator chamber; an evaporator unit provided in the inner space of the evaporator chamber for evaporating a coolant liquid and cooling the inner spaces of the freezing chamber and the evaporator chamber; a condenser unit provided on the outer surface of the evaporator chamber for condensing a coolant vapor and discharging heat of condensation of the coolant vapor; and a circulation system for circulating the coolant between the evaporator unit and the condenser unit.

8 Claims, 4 Drawing Sheets

REFRIGERATED TRANSPORT VEHICLE

BACKGROUND OF THE INVENTION

1. Field of the Invention

The present invention relates to a refrigerated transport vehicle provided with a refrigerator for land transportation.

This application is based on Japanese Patent Application No. Hei 11-16260, the contents of which are incorporated herein by reference.

2. Description of the Related Art

Conventional refrigerated transport vehicles are shown in FIGS. 3 and 4. In order to refrigerate an adiabatic freezing chamber 90 provided on vehicle 1, the refrigerated transport vehicle provides with a cooling system comprising an evaporator unit 10a or 10, a condenser unit 20a or 20, a compressor 5, and coolant pipes. FIG. 3 shows a refrigerated transport vehicle in which the evaporator unit 10a is arranged inside of the adiabatic freezing chamber 90, and the condenser unit 20a is arranged outside of the adiabatic freezing chamber 90 and above the vehicle 1. FIG. 4 shows a refrigerated transport vehicle in which the evaporator unit 10 is arranged outside of the adiabatic freezing chamber 90 and above the vehicle 1, and the condenser unit 20 is arranged on the bottom of the chassis 2 of the vehicle.

FIG. 5 shows that the evaporator 10 equipped with the adiabatic freezing chamber 90 as shown in FIG. 4. As shown in FIG. 5, an opening 91 for fixing the evaporator unit 10 to the adiabatic freezing chamber 90 is formed in the upper front wall of the adiabatic freezing chamber 90 in the travelling direction. The adiabatic evaporator chamber 30 is fixed to the adiabatic freezing chamber 90 so as to cover the opening 91. Metal fixtures 30d are used to fast fix the adiabatic evaporator chamber 30 to the adiabatic freezing chamber 90. The evaporator unit 10 is equipped in the upper inside wall of the adiabatic evaporator chamber 30, and maintains the inside of the adiabatic freezing chamber 90 cool. Metal fixtures 30c are used to fast fix the evaporator unit 10 to the adiabatic evaporator chamber 30. The outer and inner walls 30a of the adiabatic evaporator chamber 30 are made of reinforced plastics such as fiber-glass reinforced plastic (FRP) for light weight. Foamed synthetic resin 30b is filled between the outer and inner walls 30a to provide thermal insulation.

As shown in FIGS. 5 and 6, the evaporation unit 10 comprises a packing 11, an evaporator 12, a propeller type blower 13, an expansion valve 14, an accumulator 15, a drain water pool 16, and a drain water pipe 17. The drain water generated by the evaporator 12 is accumulated in the drain water pool 16. The drain water pool 16 is connected to the drain water pipe 17. The drain water pipe 17 passes through the adiabatic evaporator chamber 30, and discharges the drain water accumulated in the drain water pool 16 to the outside of the adiabatic freezing chamber 90.

The relationship between the evaporator unit 10, the condenser unit 20, and the compressor 5 of the cooling system will be explained with FIGS. 5 and 6. The compressor 5 provided in the engine room of the vehicle 1 is driven by the engine 6 for the driving the vehicle, via a conduction belt 7. When the compressor 5 is driven, a coolant vapor of high temperature and high pressure is generated by the compress or 5, passes through the coolant pipe 40, and reaches the condenser 21 of the condenser unit 20, while it is pressurized. Then the coolant vapor is cooled and condensed by contact with the outside air introduced by the propeller type fan 22 for the condenser. The coolant flows out of the condenser 21, passes through the receiver 23, the dryer 24, and the coolant pipe 41 between the condenser unit 20 and evaporator unit 10, and reaches the expansion valve 14 of the evaporator unit 10. Then the coolant adiabatically expands by passing through the expansion valve 14, and heat exchanges with air circulated between the adiabatic freezing chamber 90 and the evaporator 12 by the propeller type blower 13, while the coolant passes through the pipe for heat exchange. Thereby, the circulating air is cooled. The cooled circulating air is blown out as an airflow indicated by A from the air outlet 11a of the evaporator unit 10 to the inside of the adiabatic freezing chamber 90 by the propeller type blower 13 as shown in FIG. 5. The airflow A cools the inside of the adiabatic freezing chamber 90. The coolant gasified in the evaporator 12 passes through the accumulator 15, and the coolant pipe 42, and returns to the compressor 5 as shown in FIG. 6.

As explained above, the conventional refrigerated transport vehicle shown in FIG. 3 comprises the evaporator unit 10a in the adiabatic freezing chamber 90; therefore, the carrying capacity of the adiabatic freezing chamber 90 decreases. The conventional refrigerated transport vehicle shown in FIG. 4 comprises the condenser unit 20 arranged on the bottom of the chassis 2 of the vehicle; therefore a mudguard is necessary for the condenser unit 20. When a mudguard is provided, it is impossible to sufficiently employ the airflow generated by driving to cool the condenser 21. In addition, the condenser unit 20 or 20a and the evaporator unit 10 or 10a are separated in the conventional refrigerated transport vehicle; therefore, it is necessary to separately provide these units to the adiabatic freezing chamber 90. Consequently, much time is needed to fit these units. Therefore, a small and light weight cooling system has been desired.

SUMMARY OF THE INVENTION

It is therefore an object of the present invention to provide a refrigerated transport vehicle comprising a cooling system which is easily fit to the vehicle, whereby it is possible to decrease its manufacturing cost. Another object of the present invention is to provide a refrigerated transport vehicle comprising a small and light weight cooling system. Another object of the present invention is to provide a refrigerated transport vehicle in which the carrying capacity of the adiabatic freezing chamber 90 is not decreased, and the thermal efficiency is excellent.

In order to accomplish the above object, the refrigerated transport vehicle of the present invention comprises a vehicle body;

an adiabatic freezing chamber which is provided on the vehicle body and comprises an opening;

an adiabatic evaporator chamber fixed to an outer surface of the freezing chamber so as to cover the opening and to communicate inner spaces of the freezing chamber and the evaporator chamber;

an evaporator unit provided in the inner space of the evaporator chamber for evaporating a coolant liquid and cooling the inner spaces of the freezing chamber and the evaporator chamber;

a condenser unit provided on the outer surface of the evaporator chamber for condensing a coolant vapor and discharging heat of condensation of the coolant vapor; and a circulation system for circulating the coolant between the evaporator unit and the condenser unit.

DETAILED DESCRIPTION OF THE PREFERRED EMBODIMENTS

Figure 1:
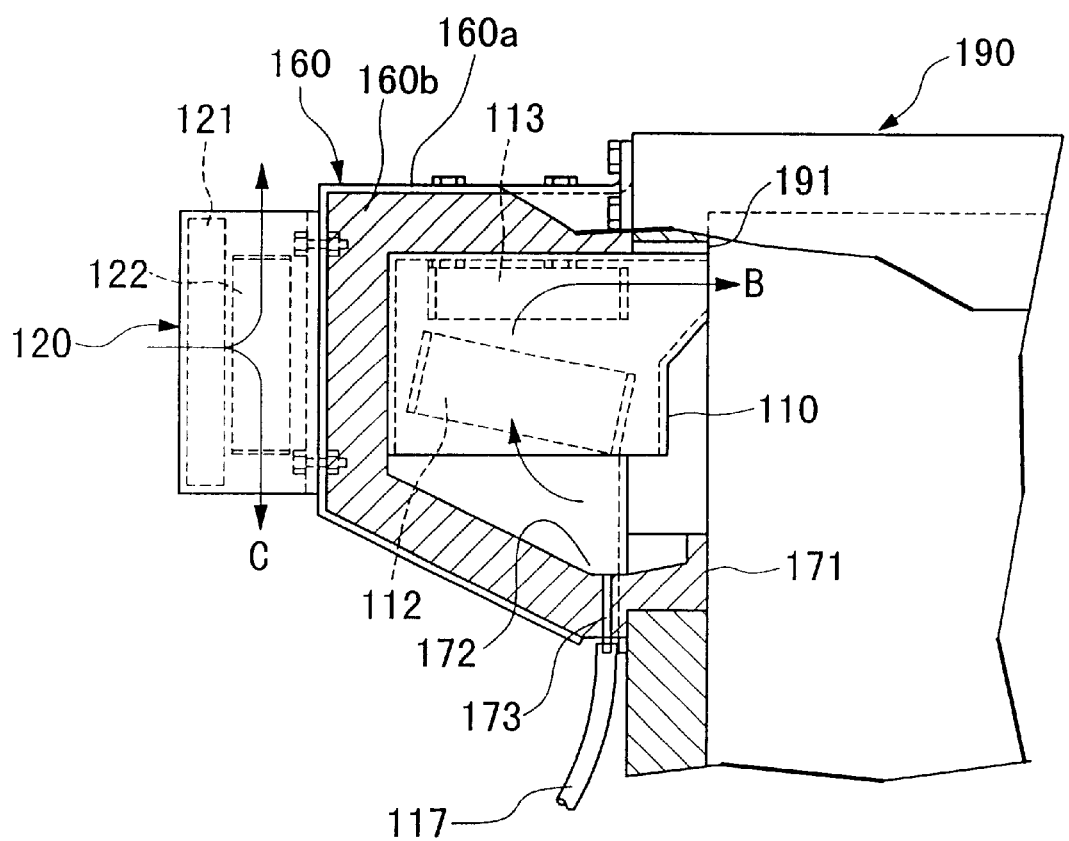
FIG. 1 shows a preferred embodiment of the evaporator unit and the condenser unit provided to the refrigerated transport vehicle of the present invention.
Figure 2:
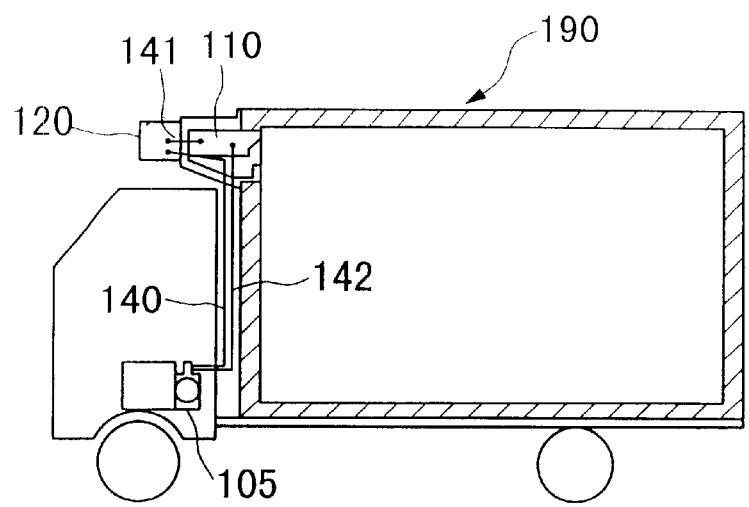
FIG. 2 shows a preferred embodiment of the refrigerated transport vehicle of the present invention.
Figure 3:
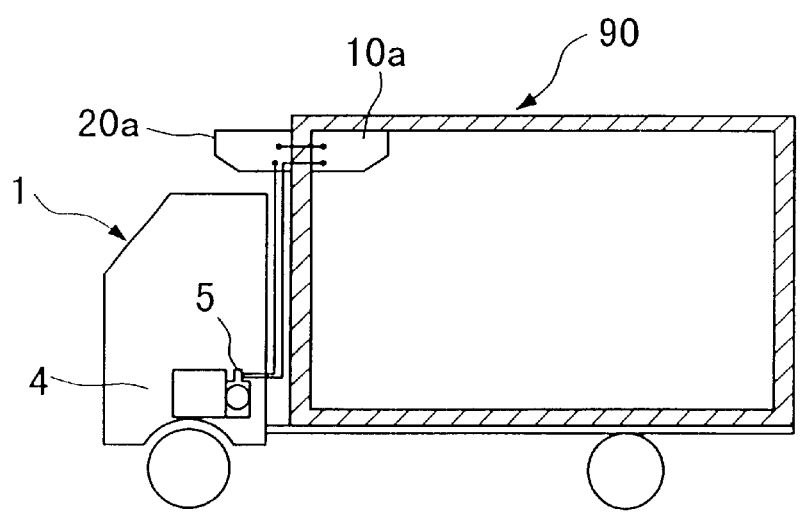
FIG. 3 shows a conventional refrigerated transport vehicle.
Figure 4:
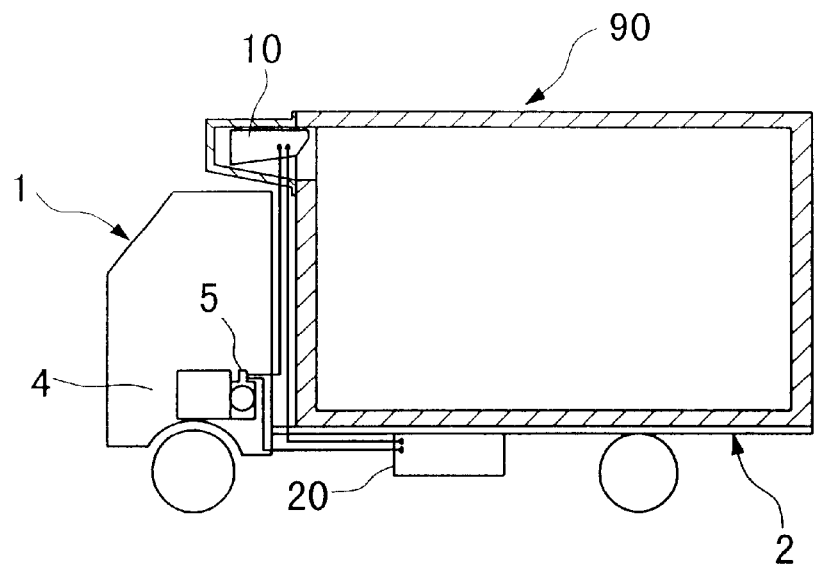
FIG. 4 shows another conventional refrigerated transport vehicle.
Figure 5:
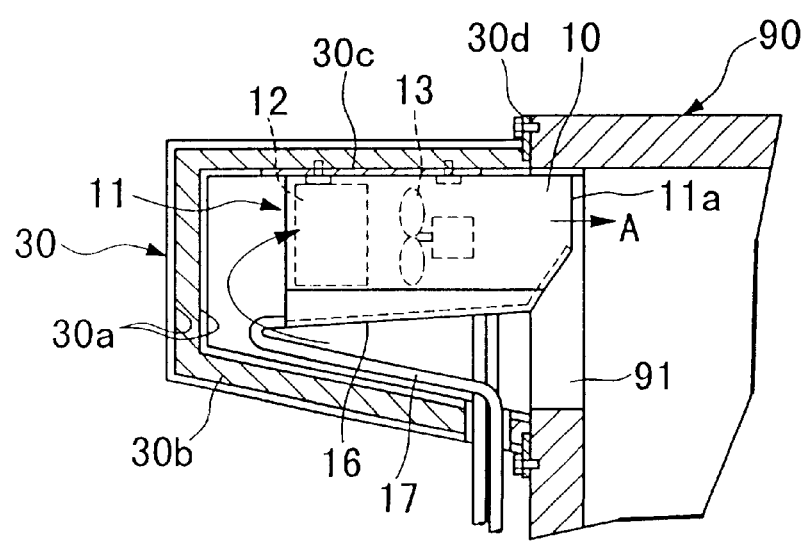
FIG. 5 shows the evaporator equipped with the adiabatic freezing chamber shown in FIG. 4.
Figure 6:
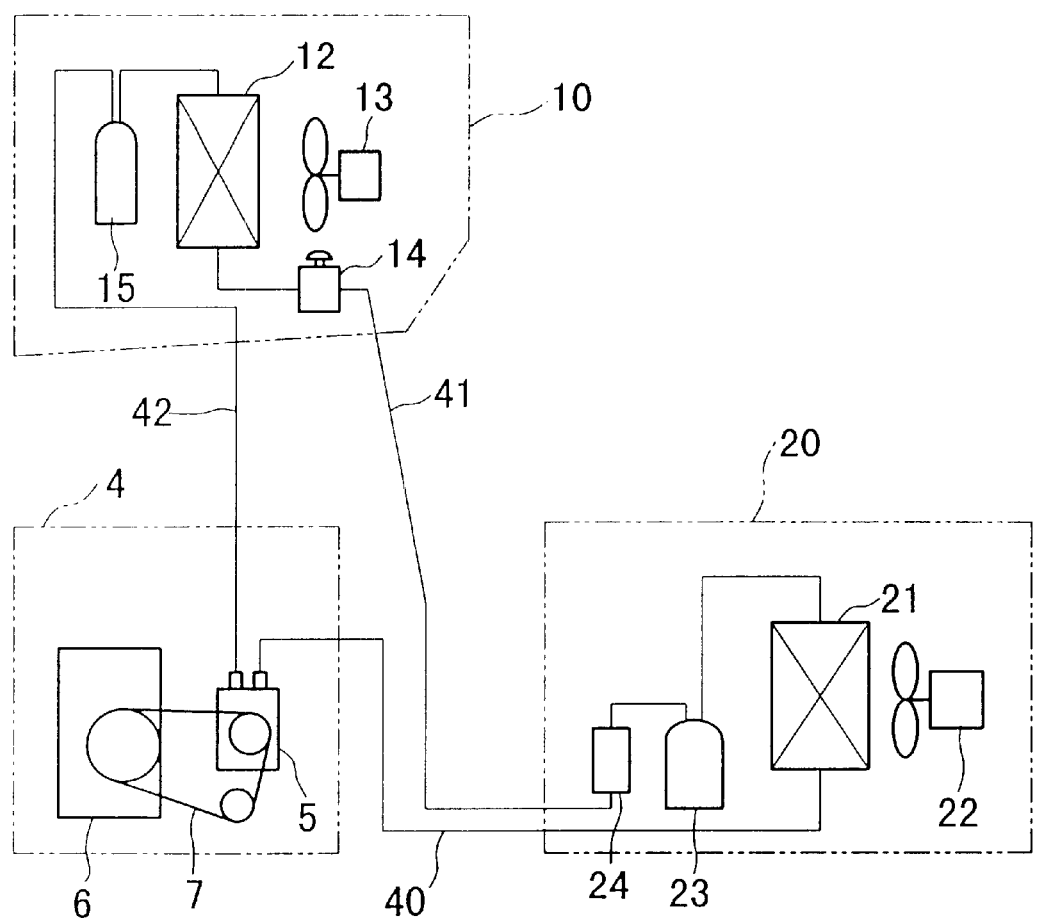
FIG. 6 shows the relationship between the evaporator unit, the condenser unit, and the compressor of the cooling system.

Referring to FIGS. 1 and 2, the preferred embodiment of the refrigerated transport vehicle according to the present invention will be explained.

FIG. 2 shows the refrigerated transport vehicle provided with the cooling system. The cooling system comprises the evaporator unit 110, the condenser unit 120, the compressor 105, and the coolant pipes 140, 141, and 142. The compressor 105 is arranged in the engine room of the vehicle. The evaporator unit 110 and the condenser unit 120 are provided to the upper part of the front wall of the adiabatic freezing chamber 190 in the travelling direction of the vehicle. In order to flow the coolant through the cooling system, the coolant pipe 140 is provided between the compressor 105 and the condenser unit 120, the coolant pipe 141 is provided between the condenser unit 120 and the evaporator unit 110, and the coolant pipe 142 is provided between the evaporator unit 110 and the compressor 105. It is preferable that the freezing chamber 190 is simple shaped, such as a quadrate shape.

As shown in FIG. 1, the adiabatic evaporator chamber 160 comprises the outer wall 160a and the foamed synthetic resin layer 160b adhered to the outer wall 160a. The adiabatic evaporator chamber 160 is box shaped, and the opening for communicating the inner spaces of the freezing chamber 190 and the evaporator chamber 160 is formed in one side. That is, the adiabatic evaporator chamber 160 comprises the side walls and the front wall in the travelling direction, the ceiling wall flat extending from the top edge of the front wall, and the bottom wall. Furthermore, it is preferable that the bottom wall comprises the front slope face downwardly extending from the bottom edge of the front wall and the back slope face upwardly extending from the rear end of the front slope face. That is, the front slope face and the back slope face are crossed so as to form a V-shape. The opening is formed at the opposite side to the front wall. The adiabatic evaporator chamber 160 is attached to the adiabatic freezing chamber 190 with bolts so that the opening of the evaporator chamber 160 covers the opening 191 formed in the upper part of the front wall of the adiabatic freezing chamber 190 in the travelling direction. The evaporator chamber 160 can be detached from the freezing chamber 190 by loosening the bolts.

Moreover, the adiabatic evaporator chamber 160 comprises the dike portion 171 substantially upwardly extending from the rear end of the back slope face of the bottom wall. Thereby, the drain water receiver 172 is formed in the bottom of the adiabatic evaporator chamber 160. Therefore, it is unnecessary to separately provide a drain water receiver. The drain water is accumulated in the space between the side walls, the bottom wall, and the dike portion 171. In addition, the opening 173 for discharging the drain water is formed in the bottom of the drain water receiver 172. The drain pipe 117 is connected to the opening 173 for discharging the drain water, whereby the drain water is discharged from the evaporator chamber 160.

The evaporator unit 110 is provided in the inner space of the adiabatic evaporator chamber 160 while the evaporator unit 110 does not protrude toward the inside of the adiabatic freezing chamber 190. The condenser unit 120 is provided on the front wall of the adiabatic evaporator chamber 160 in the traveling direction. The evaporator unit 110 and the condenser unit 120 are associated with each other.

The evaporator unit 110 comprises the evaporator 112 and the blower 113 for the evaporator. The blower 113 for the evaporator generates the airflow indicated by B for the heat exchange between the coolant and the air inside of the evaporator 112. A turbo blower which blows air perpendicularly to the inflow direction of the air is suitable for the blower 113. That is, the turbo blower which takes air from the bottom side thereof, and flat blows out the air to the inner space of the freezing chamber 190 is preferable for the blower 113.

The condenser unit 120 comprises the condenser 121 and the blower 122 which generates the airflow indicated by C for the heat exchange between the coolant inside of the condenser 121 and the open air. The propeller blower is suitable for the blower 122. Moreover, when it is not necessary to generate the airflow C blowing both upwardly and downwardly, it is possible to use the turbo blower as the blower 122.

The relationship between the evaporator unit 110, the condenser unit 120, and the compressor 105 of the cooling system will be explained referring to FIGS. 1 and 2. The compressor 105 provided in the engine room of the vehicle is driven by the engine 6 (not shown in FIGS. 1 and 2) for the driving the vehicle. When the compressor 105 is driven, a gas coolant at high temperature and high pressure is generated by the compressor 105, passes through the coolant pipe 140, and reaches the condenser 121 of the condenser unit 120, while it is pressurized. Then the gas coolant is cooled and condensed by contact with the outside air introduced by the propeller type fan 122 for the condenser. The coolant liquid flows out of the condenser 121, passes through the coolant pipe 141 between the condenser unit 120 and evaporator unit 110, and reaches the expansion valve (not shown in FIGS. 1 and 2) of the evaporator unit 110. Then the coolant liquid adiabatically expands by passing through the expansion valve, and heat exchanges with air circulated between the adiabatic freezing chamber 190 and the evaporator 112 by the blower 113 for the evaporator, while the coolant passes through the pipe for heat exchange. Thereby, the circulating air is cooled When the adiabatic evaporator chamber 160 comprises the front slope face upwardly extending from bottom of the adiabatic evaporator chamber 160, the air is easily circulated from the inside of the adiabatic freezing chamber 190 to the evaporator 112, because the air rises along the front slope face. The cooled circulating air is blown out as an airflow indicated by B from the air outlet of the evaporator unit 110 to the inside of the adiabatic freezing chamber 190 by the blower 113 for the evaporator as shown in FIG. 1. The airflow B cools the inside of the adiabatic freezing chamber 190. The coolant gasified in the evaporator 112 passes through the coolant pipe 142, and returns to the compressor 105.

As explained above, the evaporator chamber 160, the evaporator unit 110 and the condenser unit 120 are assembled as a unit in the refrigerated transport vehicles of the present invention. Therefore, the coolant pipe between the evaporator unit 110 and the condenser unit 120 can be short; whereby the vehicle of the present invention can be light in weight, compared with the refrigerated transport vehicles in which the condenser unit is provided on the bottom of the chassis of the vehicle. In addition, it is possible to provide the evaporator unit 110 and the condenser unit 120 on the adiabatic freezing chamber 190 as a unit; therefore, the arrangement of the evaporator unit 110 and the condenser unit 120 to the adiabatic freezing chamber 190 is simple. The manufacturing cost of the refrigerated transport vehicles of the present invention is decreased, because the number of the assembling processes is small.

In addition, the bottom of the adiabatic evaporator chamber 160 functions as a drain water receiver in the refrigerated transport vehicles of the present invention. Therefore, it is not necessary to specially provide the drain water receiver. The weight of the refrigerated transport vehicles of the present invention is decreased. Moreover, it is possible to decrease the manufacturing cost of the refrigerated transport vehicle, because the special element for the drain water receiver is not necessary.

When the blowers which blow air perpendicularly to the inflow direction of the air such as a turbo blower is used as the blower 113 for the evaporator, it is possible to make the evaporator unit 110 compact.

When the condenser unit 120 is provided in the upper front wall of the adiabatic freezing chamber 190 in the travelling direction, a mudguard is not necessary. Therefore, it is possible to decrease the weight and the manufacturing cost of the refrigerated transport vehicle, compared with the refrigerated transport vehicles in which the condenser unit is provided on the bottom of the chassis of the vehicle. In addition, it is possible to sufficiently employ the airflow generated by driving to cool the condenser; therefore, the efficiency of the condenser can be improved without a decrease in the carrying capacity.

The refrigerated transport vehicle in which the condenser unit 120 is provided in the upper front wall of the adiabatic freezing chamber 190 in the travelling direction is explained above. However, it is possible to provide the condenser unit 120 on the top or the bottom wall of the adiabatic evaporator chamber 160. However, the total height of the refrigerated transport vehicle increases in these cases; therefore, it is suitable to provide the condenser unit 120 in the upper front wall of the adiabatic freezing chamber 190 in the travelling direction.

What is claimed is:

1. A refrigerated transport vehicle comprising:
   a vehicle body;
   an adiabatic freezing chamber which is provided on the vehicle body and comprises an opening;
   an adiabatic evaporator chamber fixed to an outer surface of the freezing chamber so as to cover the opening and to communicate inner spaces of the freezing chamber and the evaporator chamber;
   an evaporator unit provided in the inner space of the evaporator chamber for evaporating a coolant liquid and cooling the inner spaces of the freezing chamber and the evaporator chamber;
   a condenser unit provided on the outer surface of the evaporator chamber for condensing a coolant vapor and discharging heat of condensation of the coolant vapor; and
   a circulation system for circulating the coolant between the evaporator unit and the condenser unit,
   wherein said evaporator chamber comprises the bottom wall comprising a front slope face and a back slope face, the front slope face and the back slope face are crossed so as to form a V-shape, and a drain water receiver is formed at the cross portion.

2. A refrigerated transport vehicle according to claim 1, wherein a dike portion substantially upwardly extending from the rear end of the back slope face is provided.

3. A refrigerated transport vehicle according to claim 2, wherein an opening for discharging the drain water is formed in the bottom of the drain water receiver, and a drain pipe is connected to the opening for discharging the drain water.

4. A refrigerated transport vehicle according to claim 1, wherein said condenser unit, the evaporator unit, and the freezing chamber are substantially linearly arranged in the travelling direction of the vehicle.

5. A refrigerated transport vehicle according to claim 1, wherein a drain water receiver is formed at the bottom of the evaporator chamber.

6. A refrigerated transport vehicle according to claim 1, wherein said evaporator unit comprises a blower which takes air from the bottom side thereof, and flat blows out the air to the inner space of the freezing chamber.

7. A refrigerated transport vehicle according to claim 1, wherein said evaporator chamber is provided in the upper front wall of the freezing chamber in the traveling direction of the vehicle.

8. A refrigerated transport vehicle according to claim 1, wherein said condenser unit, said evaporator unit, and said freezing chamber are substantially linearly arranged in the traveling direction of the vehicle.

* * * * *